United States Patent [19]
Papuchon et al.

[11] 4,391,486
[45] Jul. 5, 1983

[54] ELECTRICALLY CONTROLLED ELECTRO-OPTICAL SWITCH AND INTEGRATED OPTICAL CIRCUIT INCORPORATING SUCH A SWITCH

[75] Inventors: Michel Papuchon; Claude Puech, both of Paris, France

[73] Assignee: Thomson-CSF, Paris, France

[21] Appl. No.: 184,616

[22] Filed: Sep. 5, 1980

[30] Foreign Application Priority Data

Sep. 6, 1979 [FR] France .................... 79 22297

[51] Int. Cl.³ .............................................. G02B 5/14
[52] U.S. Cl. ........................... 350/96.14; 350/96.13
[58] Field of Search ............... 350/96.11, 96.12, 96.13, 350/96.14

[56] References Cited

U.S. PATENT DOCUMENTS 3,995,311 11/1976 Taylor ........................ 350/96.14
4,265,541 5/1981 Leclerc et al. .............. 350/96.14

*Primary Examiner*—David K. Moore
*Attorney, Agent, or Firm*—Cushman, Darby & Cushman

[57] ABSTRACT

An electro-optical switch for switching optical radiation between two wave guides having a coupling zone with two pairs of electrodes ($E_{11}$, $E_{12}$, $E_{21}$, $E_{22}$) respectively associated with two guides (1, 2) and positioned so as to cover a variable fraction of the width of the guides. As a result, the electro-optical effects produced and, therefore, the propagation velocities in the two guides are made variable as a function of the electrical connection mode of the electrodes. Two switching states are obtained with a considerable tolerance for the length of the guides (2L) and the control voltage.

8 Claims, 12 Drawing Figures

ELECTRICALLY CONTROLLED ELECTRO-OPTICAL SWITCH AND INTEGRATED OPTICAL CIRCUIT INCORPORATING SUCH A SWITCH

BACKGROUND OF THE INVENTION

The present invention relates to an electrically controlled electro-optical switch using radiation coupling between two optical guides.

It is known to make an integrated electro-optical switch in a substrate, on the surface of which are formed two guided propagation zones aligned parallel to one another and associated with electrodes making it possible to produce electrical fields in the guides which modify the propagation velocities. Incident radiation in one of the guides can be transferred to the other in a percentage between 0 and 100, depending on the directions and amplitudes of the electrical fields produced. With such a switch, it is necessary to have high precision with regard to the voltages to be applied to the electrodes and the length of the two parallel guided zones. Correlatively, as the optical properties of the material in which the guides are produced are dependent on the wavelength used, the conditions relative to the coupling length and the control voltages cannot be respected in a wide range of wavelengths. The same applies with regard to the polarization of the guided radiation.

BRIEF SUMMARY OF THE INVENTION

The invention aims at permitting greater manufacturing tolerances and a lesser accuracy with regard to the control voltages, whilst permitting operation in a wide range of wavelengths, no matter what the polarization of the radiation.

In order to obtain propagation velocity variations in the two guides, the invention recommends special guide and electrode configurations. Two constructional embodiments are particularly recommended. In the first, the guides are parallel in the coupling zone and are respectively associated with two electrodes sloping so as to entirely cover the guides at the end of the coupling zone. This leads to a maximum electro-optical effect if the orientation of the electro-optical material is appropriately selected, whilst being adjacent thereto in the vicinity of the centre thereof, which leads to a quasi-zero electro-optical effect. According to the second constructional embodiment, similar effects are obtained with parallel electrodes and non-parallel guides.

The invention therefore relates to an electro-optical switch which transfers between two wave guides having a common coupling zone, a predetermined fraction of optical radiation under the control of an electrical voltage in which the propagation velocity of the radiation in at least one of the two guides varies as a function of the length of said guide in such a way that the velocities in the two guides are equal at the centre of the coupling zone. The electrical voltage is applied to two pairs of electrodes respectively associated with two guides and located in the coupling zone in such a way that the electrodes of at least one of the two pairs cover the associated guide over a fraction of the guide width varying as a function of the guide length, the manner in which the two pairs of electrodes are electrically connected determining the transferred energy fraction.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
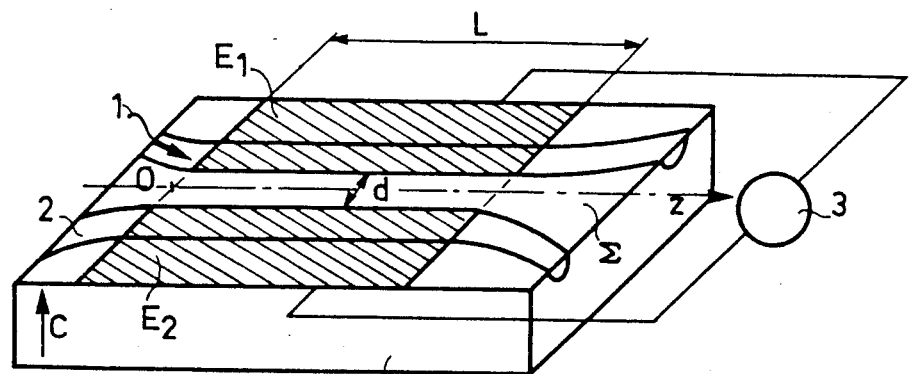
FIG. 1 a known directional coupler.

FIG. 1 shows a directional coupler in integrated optics, reference being made to the operation as an electro-optical switch. Two optical wave guides 1 and 2 are obtained in a substrate 4 by producing zones in which the refractive index exceeds that of the substrate. One conventional production process consists of the diffusion of titanium on the surface $\Sigma$ of a lithium niobate substrate. Guides 1 and 2 are made from the same electro-optical material and have the same width and thickness. They are parallel, at least over a linear portion of length L and are spaced by a value d, whose order of magnitude is a few times the wavelength of the optical radiation to be propagated in the guides.

Metal electrodes $E_1$ and $E_2$ are deposited on the face of the substrate carrying the guides. They entirely cover guides 1 and 2 over length L and are connected to a voltage supply 3.

Figure 2:
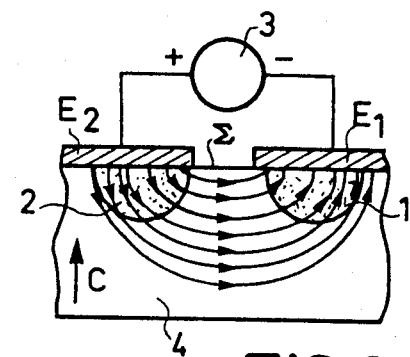
FIG. 2 a sectional view of the coupler.

The coupler is shown in section in FIG. 2, so as to illustrate the configuration of the electrical field lines created when supply 3 supplies a d.c. voltage V. It is known that the field lines are curved, traverse the guides and substrate whilst passing from one electrode to the next and, where the electrodes are located, are perpendicular to the surface $\Sigma$. Thus, the electrical field acting on guides 1 and 2 can be considered as substantially perpendicular to surface $\Sigma$, equal in absolute value and of opposite signs.

The tangential component is very small and in addition is in the same direction for the two guides.

In the case of lithium niobate it is known that the electro-optical effects are at a maximum when the electrical field is parallel to the axis c of the crystal. Thus, in FIGS. 1 and 2, axis c is shown perpendicular to surface $\Sigma$. However, when axis c is perpendicular to the electrical fields, the electro-optical effects are very small, which would be the case if axis c were parallel to surface $\Sigma$. In this case, maximum effects are obtained with an arrangement of the electrodes differing from that shown in FIGS. 1 and 2. Thus, on positioning electrodes $E_1$ and $E_2$ on either side of guides 1 and 2, so as to be contiguous but not covering the latter, it is easy to show that the field lines traverse the guides in a direction substantially parallel to the surface $\Sigma$.

Figure 3:
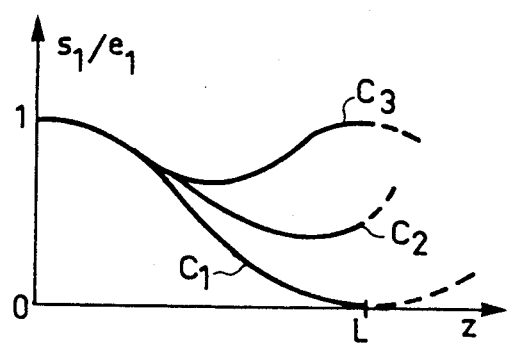
FIGS. 3 and 4 explanatory diagrams.

Using the configurations of FIGS. 1 and 2, the operation of the switch is illustrated by the curves of FIG. 3. It is assumed that the light energy is only introduced into guide 1. The diagram of FIG. 3 gives the variations of the ratio $s_1/e_1$, $e_1$ being the energy coupled in guide 1, $s_1$ being the energy present in the said guide 1 during the propagation thereof, as a function of the distance z travelled by the light waves, the zero point being taken at the end of the zone of length L corresponding to the entry of the energy.

Curve $C_1$ is obtained when the voltage V supplied by voltage source 3 is zero. Due to the coupling between the two guides, the energy progressively passes from guide 1 to guide 2 in accordance with a sine law, so that the ratio $s_1/e_1$ varies in accordance with the same law. It passes through zero at the end of a length $l_o$, called the coupling length at rest where the energy transfer is total. The transfer becomes zero again at the end of $2 l_o$ and so on.

When the voltage V applied to the electrodes is not zero, due to the electro-optical effect, it causes variations in the propagation velocity of the waves in guides 1 and 2, substantially of the same absolute value and of opposite signs. Thus, a difference $\Delta\beta$ is obtained between the phase constants of the two guides, which is well below the value $\beta_o$ of the propagation rates in the case where V=0.

This difference $\Delta\beta$ has two effects, namely a reduction in the coupling length $l_V < l_o$ and a reduction in said coupling: the transfer no longer being total for $z=l_V$. Thus, we obtain $$s_1/e_1 = \frac{1}{\frac{\Delta\beta^2}{4C^2} + 1} \sin^2_{cz}\sqrt{\frac{\Delta\beta^2}{4C^2} + 1}$$

in which C is the coupling coefficient, which is dependent on the distance d between the guides and the distribution indexes of the substrate and the guides: $C=1/l_o$. Curve $C_2$ is obtained for the value of V. On wishing to increase this value, the situation arises where the coupling length $l_V$ is equal to $l_o/2$. In this case, for $z=l_o$, where the transfer is total with V=0, the transfer is 0. On selecting $L=l_o$ or an uneven multiple of $l_o$, when V=0 all the energy is collected in guide 2 and there is a value of $\Delta\beta$ for which all the energy is collected in guide 1. Thus, a switch is obtained. The adequate value of $\Delta\beta$ is closely dependent on length L.

Figure 4:
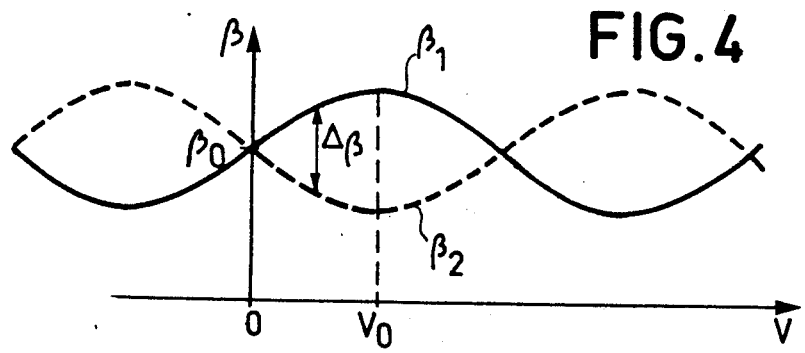

FIG. 4 illustrates the variations in the phase constants $\beta_1$ and $\beta_2$ in guides 1 and 2 as a function of the voltage V applied. When V=0, constants $\beta_1$ and $\beta_2$ have a common value $\beta_o$. When V increases, $\beta_1$ increases and $\beta_2$ decreases. The variations are sinusoidal and in opposite directions. As from a certain value of voltage $V_o$, $\beta_1$ is maximum and $\beta_2$ minimum, so that the difference $\Delta\beta$ is maximum. This difference then decreases to $V=2V_o$, etc. On reversing the polarity of voltage V, the variations are similar, but of opposite directions. To obtain a precise value of $\Delta\beta$, that which leads for example to one of the two states of the switch, it is necessary for V to belong to a range of precise values. A slight variation relative to one of the values leads to a variation in $\Delta\beta$ and to unsatisfactory operation of the switch.

Figure 5:
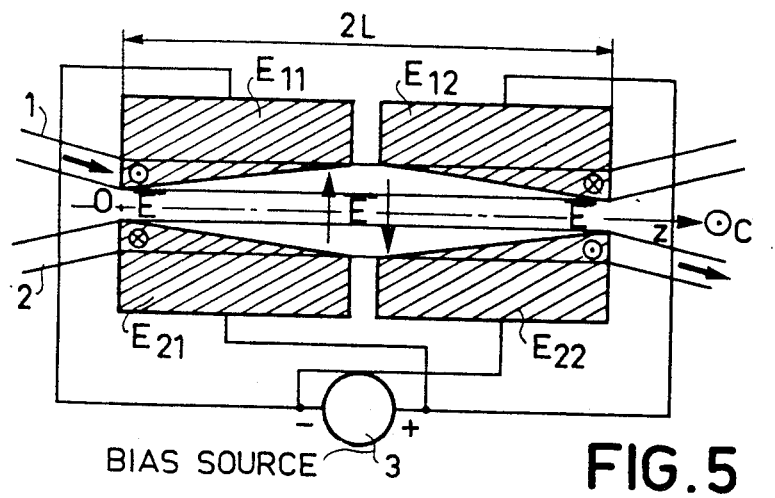
FIGS. 5 and 7 a switch according to the invention in a first operating state.

In order to reduce the accuracy requirements regarding the length L of the coupler and the switching voltage, the invention recommends a new switch diagram shown in FIG. 5 in which the substrate and guides which are the same as in FIG. 1 are referenced in the same way. A pair of electrodes of the same length (instead of one in FIG. 1) $E_{11}$, $E_2$ for guide 1, $E_{21}$, $E_{22}$ for guide 2 are associated with each of the two guides. The shape of the electrodes differs from that of electrodes $E_1$ and $E_2$ of FIG. 1. They slope with respect to the direction of the guides in a symmetrical manner to the longitudinal axis of said guides. The arrangement is such that at z=0 electrodes $E_{11}$ and $E_{12}$ respectively cover guides 1 and 2. When z increases, the electrodes progressively disengage the guides and in the case of $z=L$ they are adjacent to the guides. Symmetrically with $z=L+\epsilon$ in which $\epsilon$ has a low value, electrodes $E_{12}$ and $E_{21}$ are adjacent to the guides. When z increases, they increasingly cover the guides. They cover it completely in the case of $z=2L+\epsilon$. For the purposes of the present description, the value of $\epsilon$ is ignored. However, the electrodes of each pair are not joined.

The four electrodes are connected to a common voltage supply 3, so that the operation of the switch is dependent on the connection mode.

First state: $E_{11}$ and $E_{22}$ are connected to the positive terminal of supply 3 and $E_{12}$ and $E_{21}$ are connected to the negative terminal of supply 3.

At Z=0, as the electrodes entirely cover the guides, the configuration of the electrical field lines is like that of FIG. 2, i.e. the field in the guides is perpendicular to surface $\Sigma$, i.e. parallel to the axis c of the crystal and the electro-optical effect is at a maximum. This leads to maximum variations for constants $\beta_1$ and $\beta_2$ with respect to their common value $\beta_o$ in the absence of voltage, this being apparent from FIG. 6, $\Delta\beta$ having a value of $\Delta\beta_o$.

When z increases between 0 and L, an ever increasing part of the field lines is parallel to the surface $\Sigma$ when they traverse the guides. Moreover, the distance between the electrodes increases so that, for the same voltage, the electrical field intensity slightly decreases. Therefore, the variations of $\beta_1$ and $\beta_2$ decrease.

With z=L the electro-optical effect is quasi-zero and $\beta_1=\beta_2=\beta_o$.

As from z=L, the electrical field direction is reversed.

When e increases from L to 2L, the electro-optical effect increases but, as the field direction is reversed, the directions of the variations of $\beta_1$ and $\beta_2$ are the opposite to those of the previous case.

At z=2L, the difference $\Delta\beta$ is substantially of the same value as at z=0, but is of the opposite sign.

Figure 6:
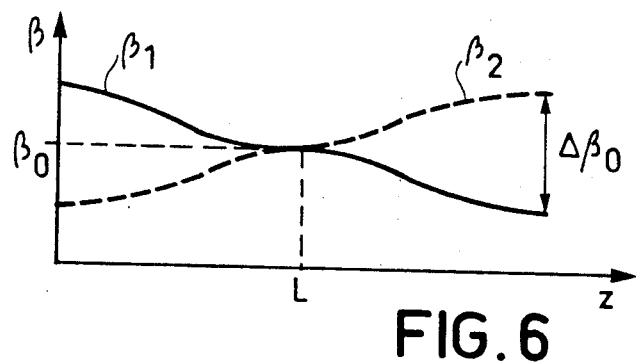
FIGS. 6 and 8 explanatory diagrams.

The variations of $\beta_1$ and $\beta_2$ as shown in FIG. 6 are continuous, provided that there are no breaks in the electrical field, i.e. the variations $\Delta\beta$ are very small over a length of the order of the wavelength of the propagated radiation. It is therefore appropriate to select a relatively low value $\Delta\beta_o$. It will become apparent hereinafter that there is a minimum threshold.

Figure 8:
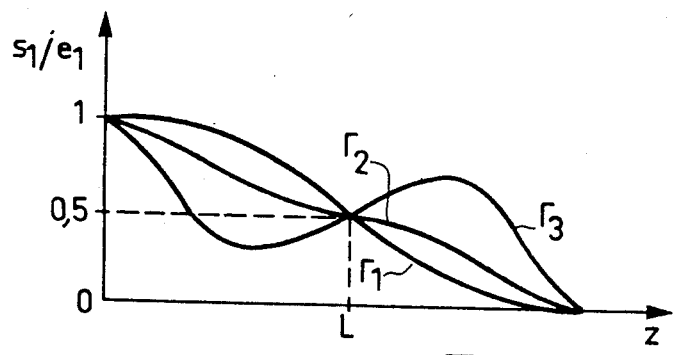
Figure 7:
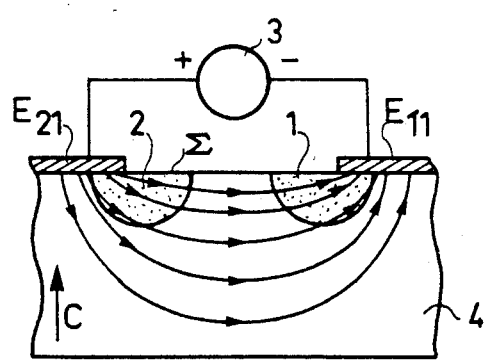

FIG. 8 shows the consequences of the operation of the device in its first state on the ratio $s_1/e_1$ between the energy present in guide 1 and the initial energy at z=0, assuming that no energy is introduced into guide 2.

The curves $\overline{1}$, $\overline{2}$, $\overline{3}$ correspond respectively to three increasing values of the ratio L/l. For curve $\overline{1}$, L=1, for curve $\overline{2}$, L/l=2 and for curve $\overline{3}$, L/l >2. In all these cases, if L≧l and if V is such that $\Delta\beta_o$ is large enough for the transfer to be almost zero at z=0, then for z=L, $s_1/e_1$ is approximately ½ and at z=2L, $s_1/e_1$ is zero. Thus, there is a total energy transfer from guide 1 to guide 2, no matter what the value of the ratio L/l, provided that this ratio exceeds 1, this applying no matter what the values of L and V (V acting on $\Delta\beta_o$ and on l).

Figure 9:
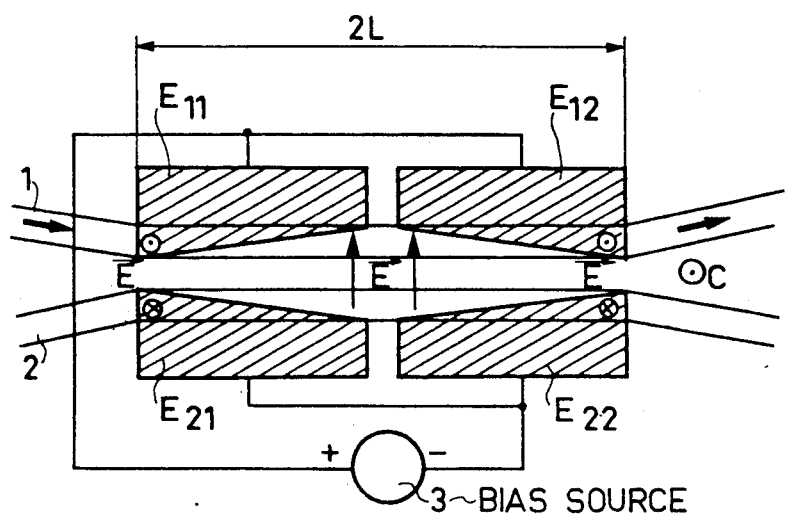
FIG. 9 a switch according to the invention in a second operating state.

Second state: The device is shown in this state in FIG. 9, $E_{11}$ and $E_{12}$ being connected to the positive terminal of supply 3 and $E_{21}$ and $E_{22}$ to the negative terminal of supply 3.

Figure 10:
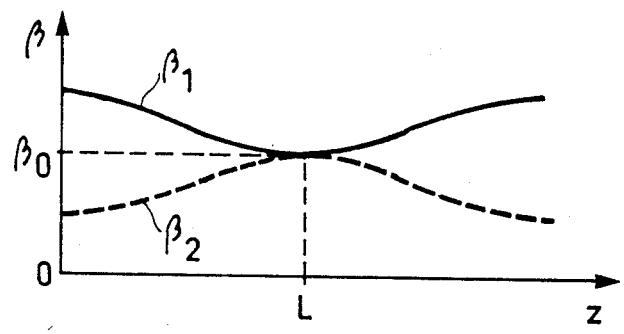
FIGS. 10 and 11 explanatory diagrams.

Between $z=0$ and $z=L$, the connection of the electrodes $E_{11}$ and $E_{12}$ is identical to the previous case, so that the orientations of the field lines are unchanged, as is the form of the variations of $\beta_1$ and $\beta_2$ shown in FIG. 10.

Between $z=L$ and $z=2L$ the orientations of the field lines are reversed compared with the previous case. The electro-optical effect obtained is of the same sign as that obtained between $z=0$ and $z=L$, so that $\beta_1$ and $\beta_2$ vary progressively relative to $\beta_o$ at their respective values in $z=0$.

Figure 11:
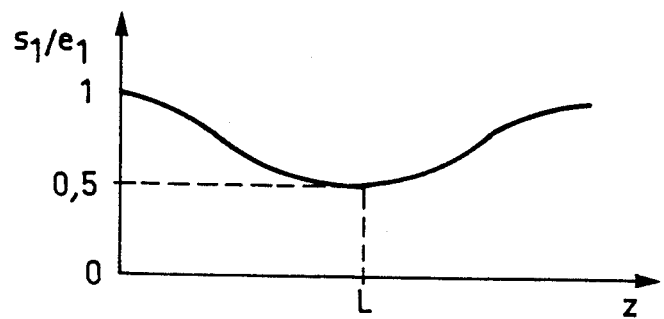

Thus, the variations of the ratio $s_1/e_1$, illustrated in FIG. 11, are identical to those shown in FIG. 8 between $z=0$ and $z=L$, i.e. from 1 to approximately $\frac{1}{2}$. Between $z=L$ and $z=2L$, $s_1/e_1$ returns to its initial value 1. Thus, there is a zero energy transfer between guides 1 and 2, no matter what the values of L and V satisfying the aforementioned conditions. Thus, the two-state switch obtained operates with large tolerances on the sizes of the coupler and the control voltage. Due to this tolerance, the device is able to operate in a very large wavelength band. It can also be insensitive to the polarization of the guided radiation.

As a non-limitative example, the switch according to the invention can be produced with guides of width 2 $\mu$m spaced by $d=3$ $\mu$m, obtained by titanium diffusion in lithium niobate. The length of each half can be approximately 1 to 2 cm and the control voltage V can be below 10 V. In this way, maximum relative variation $\Delta\beta/\beta_o$ can be obtained of the order of $10^{-4}$ to $10^{-3}$, $\beta_o$ being approximately 2.2 for lithium neobate.

Figure 12:
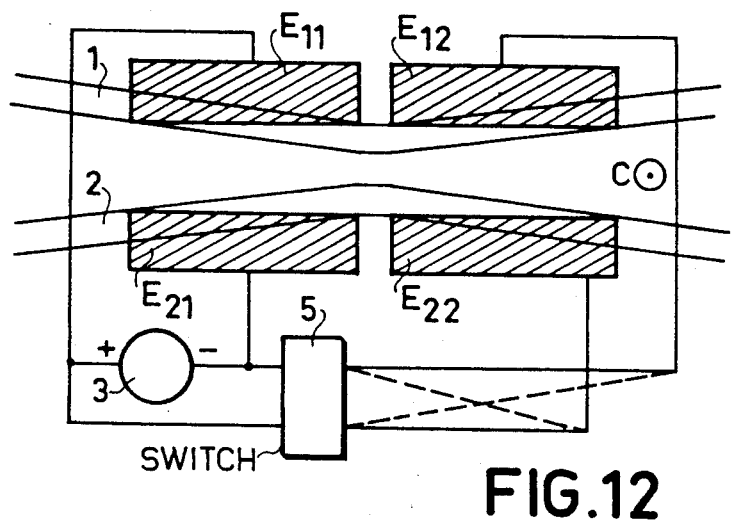
FIG. 12 a constructional variant of the invention.

Slow variations in the coupling coefficient between the guides can be obtained with parallel guides and sloping electrodes as described hereinbefore. Similar results are obtained with non-parallel guides, as shown in FIG. 12. The orientation variations of the field lines with respect to the guides are the same. So as not to modify the properties of the coupler, the distance between the guides must not vary too much. FIG. 12 also shows in non-limitative form means for controlling the switching state. It is a rotary switch having two inputs respectively connected to the positive and negative terminals of voltage supply 3, which can connect said terminals to electrodes $E_{12}$ and $E_{22}$ in order to obtain either the first state (connections in continuous lines) or the second state (connections in dotted lines).

It is possible to obtain intermediate configurations between the two described in which neither the guides nor the electrodes are parallel.

What is claimed is:

1. An electrically controlled electro-optical switch incorporating two wave guides formed in an electro-optical material and electrodes producing an electrical field for modulating the velocity of the optical radiation propagated by said guides into adjacent portions in order to effect an energy transfer as a function of a control voltage, wherein the intensity of the modulating electrical field created by the electrodes increases along said adjacent portions on moving away from the centres thereof, the electrical field orientations on either side of said centres being the same in one switching state and reversed in the other switching state.

2. A switch according to claim 1, wherein it comprises two pairs of electrodes, each pair creating electrical fields in the two portions respectively on either side of their centres, the width fraction of the guides covered by the electrodes increasing on moving away from the centres of the portions with the same sign, the switch also having voltage generating means supplying voltages of the same sign in the first state and of opposite signs in the second state between the two electrodes.

3. A switch according to claim 2, wherein as the two portions are parallel, the electrodes slope so as to completely cover the ends of the two portions; whilst being adjacent to the two portions in the vicinity of their centres.

4. A switch according to claim 2, wherein the electrodes of the two pairs have a constant distance between them, so that the two portions are not parallel and are completely covered by the electrodes at their ends and are adjacent to the electrodes in the vicinity of their centres.

5. A switch according to claim 2, wherein the generating means comprise a voltage supply having control means permitting the parallel connection thereof to the two electrodes of the two pairs in the same direction for the first state and in the opposite direction for the second state.

6. A switch according to claim 1, wherein the guides are formed on the surface of a ferro-electrical substrate.

7. A switch according to claim 6, wherein the material is lithium niobate orientated in such a way that its axis C is perpendicular to the surface where the guides are formed, the latter being obtained by titanium diffusion in the substrate.

8. An integrated optical circuit, wherein it comprises at least one switch according to one of the preceding claims.

* * * * *